United States Patent
Sohn

(10) Patent No.: US 10,427,366 B1
(45) Date of Patent: Oct. 1, 2019

(54) MANUFACTURING MICROLENS ARRAYS USING A PROGRESSIVE INDENT SYSTEM

(71) Applicant: Facebook Technologies, LLC, Menlo Park, CA (US)

(72) Inventor: Alexander Sohn, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 348 days.

(21) Appl. No.: 15/346,153

(22) Filed: Nov. 8, 2016

(51) Int. Cl.
*B29D 11/00* (2006.01)
*G02B 3/00* (2006.01)

(52) U.S. Cl.
CPC ...... *B29D 11/00365* (2013.01); *G02B 3/0031* (2013.01)

(58) Field of Classification Search
CPC .................. B29D 11/00365; G02B 3/0031
See application file for complete search history.

(56) References Cited

U.S. PATENT DOCUMENTS

2010/0001434 A1* 1/2010 Atkin ................ B01L 3/502707
264/293
2015/0239172 A1* 8/2015 Dow ..................... B29C 33/424
264/2.7

OTHER PUBLICATIONS

Zdanowicz, E. et al., "Rapid Fabrication of Nanostructured Surface Using Nanocoining," Nanotechnology, Sep. 2012, pp. 1-10, vol. 23, No. 415303.

* cited by examiner

*Primary Examiner* — Timothy Kennedy
*Assistant Examiner* — John Robitaille
(74) *Attorney, Agent, or Firm* — Fenwick & West LLP

(57) ABSTRACT

A progressive indent system is used to manufacture a mold for a microlens array. The system includes a die, an actuator, and a controller. The die comprises a plurality of protrusions, wherein each of the protrusions is configured to create an impression in a substrate. Each protrusion has a different priority and is arranged in order of increasing priority on the die. The actuator is coupled to the die and receives actuation instructions from the controller. The actuation instructions cause the actuator to stamp a specific location on the substrate with the plurality of protrusions in order of increasing priority, wherein successive impressions at the specific location progressively form the final shape of a microlens mold. The actuator may move the die repeatedly across the substrate to form a plurality of individual microlens molds at several locations on the substrate, forming a mold for a microlens array.

20 Claims, 7 Drawing Sheets

MANUFACTURING MICROLENS ARRAYS USING A PROGRESSIVE INDENT SYSTEM

BACKGROUND

The disclosure relates generally to manufacturing microlens arrays, and more specifically to a progressive indent system for manufacturing microlens arrays.

A microlens array is an optical element that may be used in cameras, microscopes, and other imaging technologies to improve the amount of imaging information captured by an image sensor. Typically, a microlens array is an array composed of a plurality of microlenses, wherein each microlens may have a diameter less than a millimeter and may even measure on the micron scale. Manufacturing a microlens array presents a number of challenges due to the size of each microlens, precision of the shape required for each microlens, and the number of microlenses in each microlens array. To achieve the precise shape of each microlens, a microlens array is typically manufactured using precision machining, such as diamond-turning. However, the larger the microlens array, the longer it can take to manufacture. For instance, a microlens array for a 1-megapixel camera may include 1,000,000 microlenses, and at a rate of manufacturing one microlens per second, the overall cycle could take 1 million seconds (approximately 11.5 days). Keeping the machining process stable for such a long time presents a significant technical challenge and results in excessive risk and cost for such an operation. Thus, an improved manufacturing process for creating microlens arrays is needed.

SUMMARY

A progressive indent system is configured for manufacturing a mold for a microlens array through a stamping process. The system includes a die, an actuator, and a controller. The die comprises a plurality of protrusions, wherein each of the protrusions is configured to create an impression in a substrate. Note, each active protrusion has a different priority. However, in some embodiments, there may be one or more extra (spare) non-active protrusions that may be used if, e.g., its corresponding protrusion is damaged. These non-active protrusions would have a same priority as their corresponding active protrusions. In some embodiments, the protrusions are arranged in order of increasing priority on the die.

The actuator is coupled to the die and receives actuation instructions from the controller. The actuation instructions cause the actuator to stamp a specific location on the substrate with the plurality of protrusions in order of increasing priority, wherein successive impressions at the specific location progressively form the final shape of a microlens mold.

The actuation instructions are generated by the controller and comprise a tool path sequence by which the actuator moves the die across the substrate during the stamping process. In an example embodiment, the stamping process produces a four-step cycle to create an individual microlens mold in the substrate. In the example embodiment, the die includes four protrusions that are substantially dome-shaped and are arranged on the die in an order of increasing priority, wherein the priority is based on a relative size of each dome-shaped protrusion. The stamping process comprises a specified tool path sequence that forms an individual microlens mold by stamping a single location on the substrate with each of the four protrusions in order of successive priority. In this way, an initial impression is created in the substrate, and the initial impression is progressively modified until the fourth and final impression culminates in the final shape of the microlens mold. The die is moved repeatedly across the substrate to form a plurality of individual microlens molds at several locations on the substrate, forming a mold for a microlens array.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
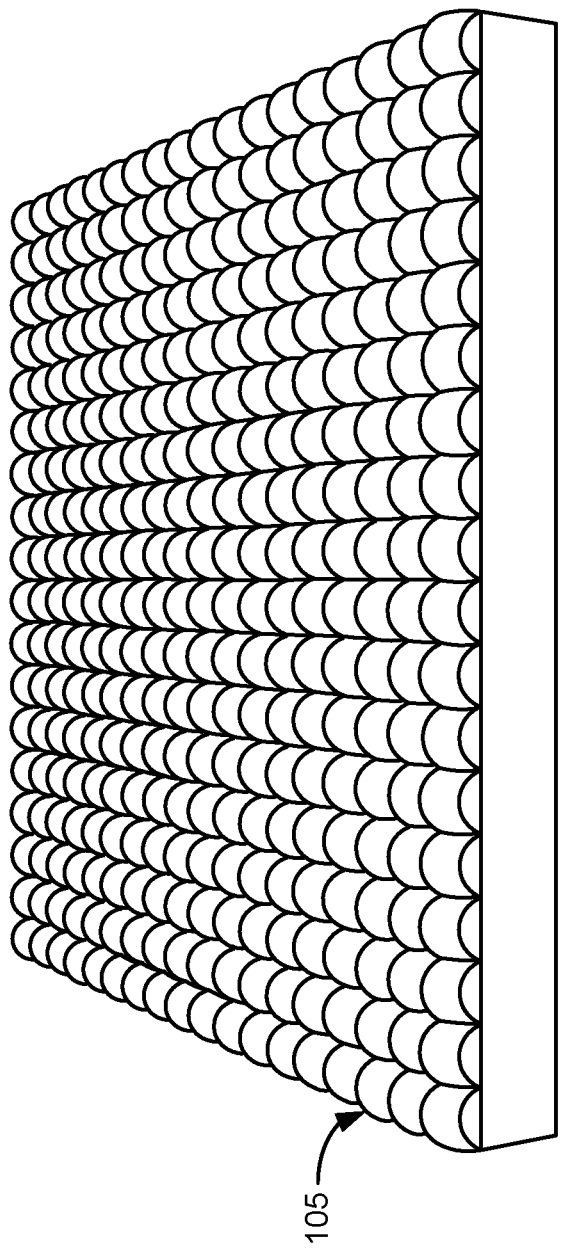
FIG. 1 is an example microlens array, according to an embodiment.

FIG. 1 is an example microlens array 100, according to an embodiment. A microlens array is an optical element that may be used in, for example, cameras, microscopes, and other imaging technologies to improve the amount of light captured by an image sensor. The image sensor captures images using an array of photo-sensitive pixels, in which each pixel collects image data. As illustrated in FIG. 1, the microlens array 100 is composed of a plurality of microlenses 105. Generally, a microlens is a small lens having a diameter less than a millimeter. The lens profile may be, e.g., spherical, aspherical, freeform, etc. In FIG. 1 each microlens is a positive lens, however, in other embodiments some or all of the microlenses may be negative lenses. As microlenses typically are used with some sort of image sensor, each of the microlenses is transparent (or substantially transparent) to light which the image sensor is configured to detect (e.g., visible, IR, etc.). A microlens may be composed of a transparent material, e.g., glass, plastic polymers, or any other suitable transparent material. In some embodiments, the microlens array and the image sensor pixels may have a 1:1 ratio, wherein an individual microlens corresponds to an individual pixel. In other embodiments, each microlens in the microlens array may cover multiple pixels. In the embodiment of FIG. 1, the microlens array 100 is an array of 18 microlenses by 18 microlenses. In other embodiments, the size of a microlens array can vary greatly. As an example, a 1-megapixel camera may include an image sensor having 1,000,000 million total photo-sensitive pixels and, thus, may include a microlens array having 1,000,000 million corresponding microlenses. As the size of a microlens array increases, the amount of time to manufacture the microlens array can increase.

Figure 2:
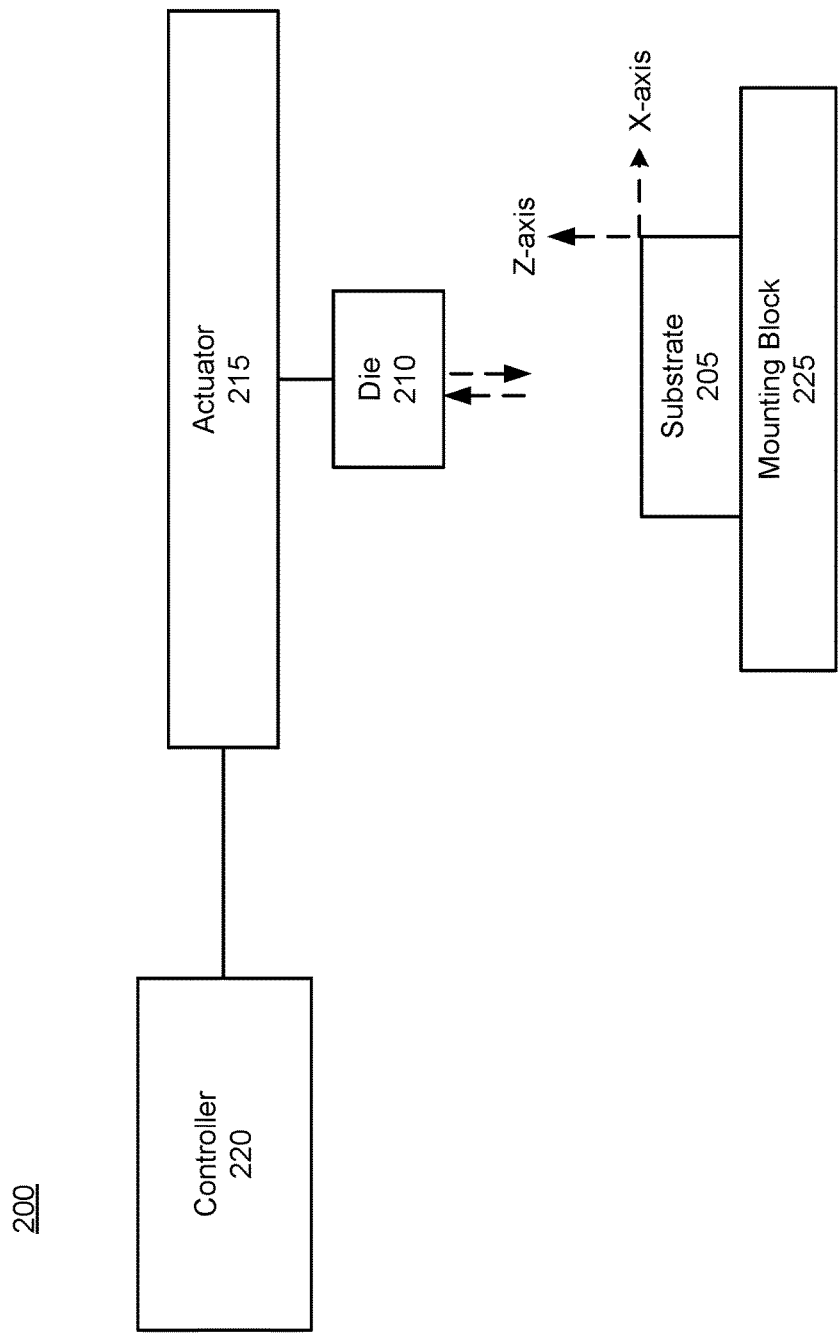
FIG. 2 is a high-level block diagram illustrating an embodiment of a progressive indent system, according to an embodiment.

FIG. 2 is a high-level block diagram illustrating an embodiment of a progressive indent system 200, according to an embodiment. The progressive indent progressive indent system 200 manufactures a mold for a microlens array by performing a stamping process on a substrate 205. In some embodiments, the progressive indent system 200 may be a fabrication machine that can be manually-operated or automated, such as a Computer Numerical Control (CNC) machine. The progressive indent system 200 includes a die 210, an actuator 215, and a controller 220 that perform the stamping process on the substrate 205 secured to a mounting block 225. Some embodiments of the system have different components than those described here. Similarly, in some cases, functions can be distributed among the components in a different manner than is described here.

The substrate 205 is a material from which the mold for a microlens array is created. The substrate 205 may be a rigid material that is capable of deformation. For example, the substrate 205 may be composed of copper, brass, or any other suitable ductile material. Such ductile materials can vary widely from metals to polymers to crystalline materials. The substrate 205 undergoes a stamping process performed by the progressive indent system 200 to become a mold for a microlens array.

The mounting block 225 secures the substrate 205 in a position that is known to the progressive indent system 200. In some embodiments, the mounting block 225 may be fixed in a position or may be configured to move within the progressive indent system 200. The mounting block 225 may be a vise, a mounting plate, or any other suitable fixture plate. This configuration allows the progressive indent system 200 to establish a coordinate system which can be used to accurately position the die 210 relative to the substrate 205 secured to the mounting block 225. In the embodiment of FIG. 2, the coordinate system is established with respect to the substrate 205. In other embodiments, the coordinate system can be established with respect to the mounting block 225 or an origin within the working space of the progressive indent system 200.

The die 210 is a rigid object that creates impressions on the surface of the substrate 205. During the stamping process, the die 210 moves relative to the substrate 205 to contact the substrate 205 at one or more specific locations on the substrate 205. In the embodiment of FIG. 2, the die 210 may include a plurality of protrusions, hereinafter referred to as "indenters." Each indenter is configured to contact the surface of the substrate 205 and create an impression in the substrate 205. The shape and size of each indenter may vary. The indenter profile may be, e.g., spherical, aspherical, freeform, etc. Each impression is a result of the substrate 205 deforming as the indenters contact the surface of the substrate 205. During the stamping process, a plurality of indenters stamp a number of impressions into a surface of the substrate 205. In some embodiments, one impression or multiple, successive impressions at the same location may create an individual microlens mold. Some indenters may be configured to create an initial impression in the substrate 205 that is approximately the negative shape of the indenter, while some indenters may be configured to contact a previously-created impression to modify the impression in some way. For example, a first indenter may create an initial impression at a specific location on the substrate 205, and a subsequent indenter may deepen, widen, or modify the shape of the initial impression. A plurality of subsequent indenters may progressively modify an individual impression until a final, desired shape of the impression is achieved. In such a configuration, each indenter may have a similar shape but vary in size, may have varying shapes but be similar in size, or some combination thereof. To achieve an accurate final, desired shape of an impression by progressively indenting the impression, finite element modeling may be used to model the behavior of the neighboring substrate material as impressions are progressively indented. Implementing a progressive indent technique may have several advantages compared to a single stamping process. For example, a progressive indent technique may create less stress in the substrate material as the substrate material is deformed, incremental amounts of deformation may be easier to control to achieve a final, desired shape, and the accuracy of the shape of each impression may increase. Several factors may be considered while modeling the stamping process, such as indentation history, interaction with neighboring indents, and strain hardening behavior of the substrate material.

In the embodiment of FIG. 2, the die 210 may be configured such that the indenters contact a specific location on the substrate 205 in a specific sequence, wherein each indenter has an assigned priority that determines its order in the sequence of the stamping process. For example, an indenter with first priority may be the first to contact a specific location on the substrate 205 and creates the initial impression, an indenter with second priority may be the second to contact the same location on the substrate 205 and modifies the initial impression, and an indenter with third priority may be the third to contact the same location on the substrate 205 and again modifies the impression. This process is repeated until all of the indenters have contacted the impression, in order of priority, sequentially modifying the impression and ultimately forming a microlens mold. The priority of an indenter may be based on a variety of factors, e.g., relative size, shape, or function of an indenter. For example, a small indenter may have a first priority while a bigger indenter may have a second priority to enlarge an impression created by the small indenter. As a note, each active protrusion has a different priority. However, in some embodiments, there may be one or more extra (spare) non-active protrusions that may be used if, e.g., its corresponding protrusion is damaged. These non-active protrusions would have a same priority as their corresponding active protrusions. The plurality of indenters may be arranged on the die 210 in a configuration based on the priority of each indenter. For example, the indenters may be arranged in a linear array, wherein the row of indenters is arranged in a sequence of increasing priority. In other embodiments, the indenters may be arranged in a 2-D array or any other multi-dimensional array, wherein the rows and columns of indenters are arranged in a sequence of increasing priority. The number of rows of indenters may be the same or different than the number of columns of indenters.

Figure 3:
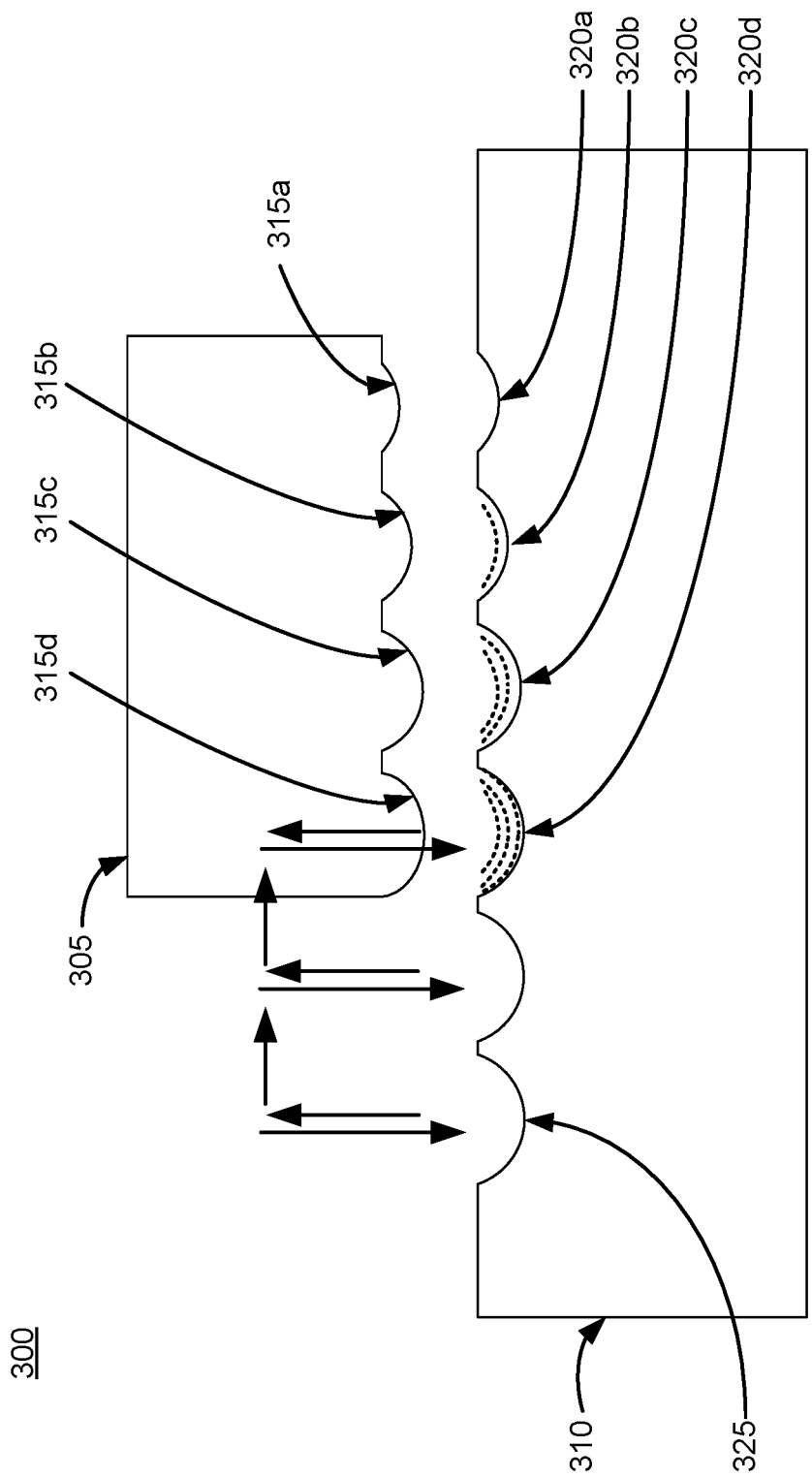
FIG. 3 illustrates an example tool path sequence for a stamping process, according to an embodiment.

The die 210 and each indenter may be composed of a rigid material (e.g., diamond, tungsten carbide, ceramics, or any other suitable hard material) that is capable of deforming the substrate 205. In the embodiment of FIG. 3, each indenter may be composed of diamond due to its ideal material properties for machining applications. Diamond is known for its hardness and low coefficient of friction, making it a widely-used material on cutting tools for precision machining, the technique known as "diamond turning." These material properties allow the indenters of the die 210 to repeatedly contact the substrate 205 during the stamping process while preserving the life and the shape of the indenters. The indenters may be lapped, polished, or formed by a focused ion beam (FIB) to achieve the precise shape of each indenter. By using diamond, the indenters on the die 210 can be used repetitiously for several cycles with minimal wear and tear. Various configurations of the die 210 and the indenters will be discussed in further detail with regards to FIGS. 3-4. The die 210 is coupled to the actuator 215 and is capable of moving relative to the substrate 205 to create one or more impressions at several locations on the surface of the substrate 205 during the stamping process.

The actuator 215 is responsible for moving the die 210 within the progressive indent system 200. The actuator 215 is configured to accurately position the die 210 relative to the substrate 205 during the stamping process. In the embodiment of FIG. 2, the actuator 215 uses an established coordinate system within the progressive indent system 200 to translate the die 210 in the x-, y-, and z-directions. In some embodiments, the coordinate system may be automatically or manually determined, and the origin of the coordinate system may vary throughout the progressive indent system 200. The actuator 215 may be capable of moving the die 210 along a single axis or multiple axes at a time. In the embodiment of FIG. 2, the actuator 215 receives actuation instructions from the controller 220. The actuation instructions may cause the actuator 215 to move the die 210 in a specific sequence or cycle during the stamping process to create the array of microlens molds in the substrate 205. In some embodiments, the actuator 215 may be a piezoelectric stack or any other suitable electrical or mechanical actuator. A frequency of the actuator 215 is the number of times at which the die 210 is advanced against the substrate 205 per a unit of time. In the embodiment of FIG. 2, the frequency of the actuator 215 is measured in hertz (Hz) and may vary between 0 Hz to several kHz, e.g., 2 Khz. The frequency can be manually or automatically programmed by an operator of the progressive indent system 200. At such frequencies, the progressive indent technique may reduce the amount of time to create a mold for a microlens array compared to traditional machining techniques.

The controller 220 controls the stamping process. In the embodiment of FIG. 2, the controller 220 generates actuation instructions that cause the actuator 215 to stamp out one or more microlens molds into a surface of the substrate 205. The actuation instructions may comprise a set of precisely programmed commands that specify a plurality of tool paths for the die 210. A tool path is the path that a tool, e.g., die 210, follows during a manufacturing process. Tool paths may be optimized with respect to a variety of factors, e.g., shortest route between a first location and a second location, order of machining operations, or any other aspects of manufacturing. In the embodiment of FIG. 2, the controller 220 generates the tool paths with respect to the priority of the indenters on the die 210. As previously described, the die 210 may be configured such that the indenters contact a specific location on the substrate 205 in a specific sequence based on the priority of each indenter. As the actuator 215 moves the die 210 along the tool paths, each indenter of the die 210 subsequently contacts the specific location on the substrate 205 in order of increasing priority to form the final shape of a microlens mold at the specific location. The actuation instructions for a stamping process may comprise a plurality of tool paths such that the actuator 215 moves the die 210 across the substrate 205 until a desired area of the substrate 205 includes the microlens molds. The surface of the substrate 205 may be stamped several times to create an array or grid-like formation of microlens molds. The commands for the plurality of tool paths may be manually programmed by an operator of the progressive indent system 200 or automatically programmed by the progressive indent system 200. The controller 220 provides the actuation instructions to the actuator 215. In some embodiments, the actuation instructions may also comprise the rate at which the die 210 travels along each tool path.

FIG. 3 illustrates an example tool path sequence 300 for a stamping process, according to an embodiment. In the embodiment of FIG. 3, the progressive indent system performs the stamping process and includes a die 305 and a substrate 310. The die 305 is a simplified, one-dimensional example of a die that can be used for the stamping process and is an embodiment of the die 210. The progressive indent system is an embodiment of the progressive indent progressive indent system 200. As the progressive indent system performs the stamping process, the die 305 moves along and follows the tool path sequence 300 to stamp the substrate 310. In the embodiment of FIG. 3, the die 305 includes indenters 315a, 315b, 315c, and 315d.

The indenters 315a, 315b, 315c, and 315d are configured to create impressions in the substrate 310 during the stamping process. In the embodiment of FIG. 3, the indenters are arranged in a single row on the die 305 and in order of increasing priority. Indenter 315a has first priority, indenter 315b has second priority, indenter 315c has third priority, and indenter 316d has fourth priority. In the embodiment of FIG. 3, each indenter is substantially dome-shaped, and the priority of the indenters is based on relative size, in terms of height or width, of an indenter. As illustrated in FIG. 3, indenter 315a is the smallest indenter with successive indenters increasing in size up to indenter 315d, which is the biggest indenter. In alternate embodiments, as previously described, the priority of an indenter may be based on a variety of factors, e.g., relative size, shape, or function of an indenter. In the embodiment of FIG. 3, the die 305 is configured such that indenter 315a creates a first impression in the substrate 310, and each successive indenter modifies (e.g., widens, deepens, or both) the existing impression formed by the previous indenters until the indenter 315d creates the final impression to form a final, target shape of a microlens mold. As described with regards to FIG. 2, the die 305 and the indenters 315 may be lapped, polished, or formed by a focused ion beam (FIB) to achieve the precise shape of each indenter 315. The shape, size, number, and arrangement of indenters may vary in other embodiments to produce a variety of sequences for the stamping process.

A plurality of impressions 320a, 320b, 320c, 320d are created in the substrate 310 by the indenters as the progressive indent system performs the stamping process. As previously described, the die 305 includes a single row of four indenters 315a, 315b, 315c, 315d that are arranged in order of increasing priority. This configuration of the die 305 produces a four-step sequence, wherein four successive impressions are made at a specific location such that the fourth and final impression culminates in the final shape of a microlens mold 325. In FIG. 3, the impressions are illustrated at various depths and stages of the stamping process. For example, impression 320a is an initial impression created by the indenter with first priority, indenter 315a. Impression 320d is a final impression that has been formed by successive indenters in order of increasing priority. Three dashed lines within impression 320d illustrate the progression of impressions as each indenter 315a, 315b, 315c, and 315c stamps the same location until the final shape of the impression, such as microlens mold 325, is achieved.

In the embodiment of FIG. 3, the progressive indent system moves the die 305 along the tool path sequence 300 to form the plurality of impressions in the substrate 310. As previously described, the actuator is responsible for positioning the die 305 at a specific location and for translating the die 305 towards and away from the die 305 to stamp the indenters into the substrate 310 at the specific location. Due to the configuration of the die 305, the stamping process comprises a four-step sequence to create the final shape of each microlens mold 325. Each step comprises: positioning the die 305 relative to the substrate 310 such that an indenter is above a specific location, actuating the die 305 towards the substrate 310 to stamp the indenter into the substrate 310 at the specific location, and translating the die 305 away from the substrate 310. This step is repeated for each indenter in order of increasing priority. For example, in the embodiment of FIG. 3, the indenters in order of increasing priority are as follows: indenter 315a, indenter 315b, indenter 315c, and indenter 315d. Specifically in this four-step sequence, the indenter 315a creates an initial impression, such as impression 320a. The actuator moves the die 305 to position the second indenter 315b above the initial impression 320a and then actuates the die 305 to stamp the initial impression 320a, thereby modifying the impression, creating an impression such as impression 320b. The actuator repeats these steps for indenter 315c and indenter 315d to modify existing impressions and to create the final shape of a microlens mold.

To create an array of microlens molds, the actuator may repeat this four-step sequence several times. The actuator may move the die 305 to specific locations across the substrate 310 to create a row of microlens molds and then multiple rows of microlens molds to form the final microlens array. Due to the configuration of the die 305, each time the die 305 contacts the substrate 310, more than one indenter may contact the surface of the substrate 310. For example, each indenter 315a, 315b, 315c, 315d may contact the substrate 310, such that four impressions may be made and/or deepened at a single time, thus forming four impressions at four separate stages. As illustrated in FIG. 3, impressions 320a, 320b, 320c, 320d are simultaneously formed. As the progressive indent system cycles through the stamping process to create an array of microlens molds, the actuator re-positions the die 305 relative to the substrate 310 such that an indenter of successive priority is accurately positioned above a corresponding existing impression. By forming and/or deepening multiple impressions at a single time each time the actuator translates to a new position in the tool path sequence, the cycle time to manufacture the mold for the microlens array may decrease.

Since the indenters create the plurality of impressions by deforming the substrate 310 rather than removing material from the substrate 310, each indent may affect the shape of neighboring impressions due to elastic behavior of the substrate material. In other words, as the indenters create impressions in the substrate 310, the substrate material is compressed and/or displaced. The deformation of the substrate material may distort previously-created impressions. In order to obtain an accurate final shape of each microlens mold, the shape of each indenter is specifically designed to compensate for distortions due to neighboring indents and elastic behavior of the material during the stamping process.

Figure 4:
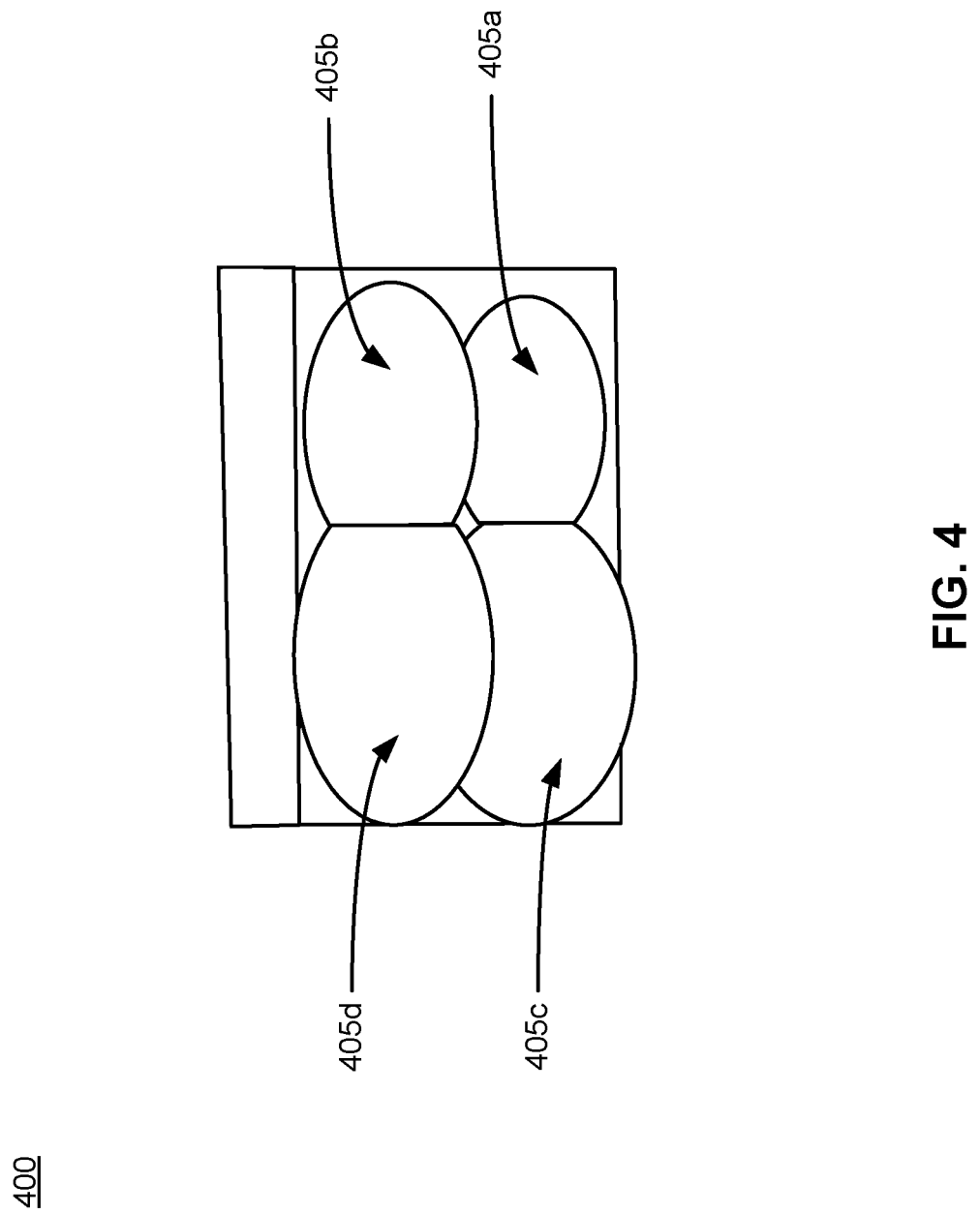
FIG. 4 illustrates an example die including a plurality of protrusions, according to an embodiment.

FIG. 4 illustrates an example die 400 including a plurality of progressive protrusions arranged in a 2-D array, according to an embodiment. Illustrated in FIG. 4 is a simplified, two-dimensional example of a die 400. The die 400 is an embodiment of the die 210. The die 400 comprises two rows of indenters 405a, 405b, 405c, 405d that together form a 2-D array. Indenters 405a, 405b, 405c, 405d are each substantially dome-shaped, but in a progressive manner, such that successive impressions of each indenter in a substrate forms a target shape for a microlens mold. Similar to the indenters 320 as described with regards to FIG. 3, the indenters 405 are arranged according to the priority of each indenter. In the embodiment of FIG. 4, indenter 405a has first priority, creating the initial impression, and indenter 405d has the fourth priority, creating the final impression. This configuration of the die 400 produces a four-step sequence, wherein the fourth and final impression culminates in the final shape of the microlens mold. During the stamping process, the die 400 creates impressions in two rows simultaneously rather than in a single row with die 305. In other embodiments, the die 400 may include additional indenters, such as a total of six, nine, twelve, and so forth. Additional indenters may increase the number of individual microlens molds formed at a single time, thereby decreasing the overall cycle time to produce the mold for the microlens array.

Figure 5:
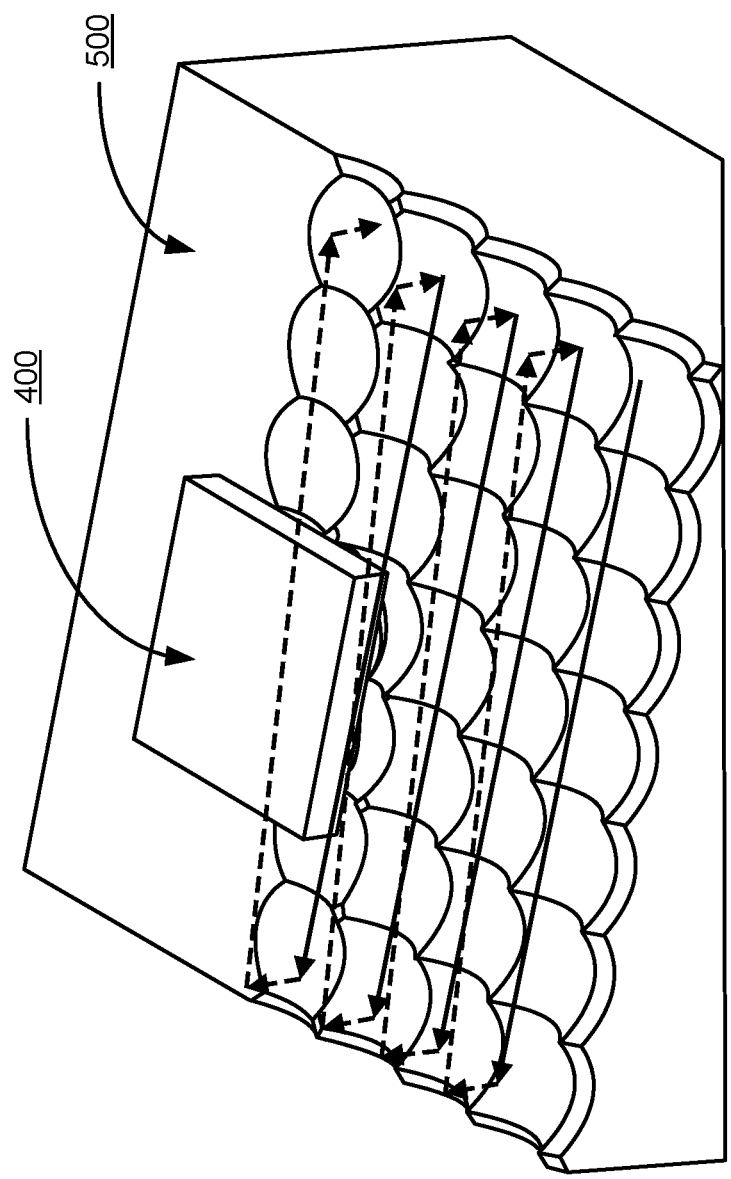
FIG. 5 illustrates an example tool path sequence of the die of FIG. 4 to progressively create a mold for a microlens array, according to an embodiment.

FIG. 5 illustrates an example tool path sequence 500 of the die 400 of FIG. 4 to progressively create a mold for a microlens array, according to an embodiment. The tool path sequence of a stamping process may be dependent on the arrangement of the indenters on the die 400. For example, in the embodiment of FIG. 5, the die 400 includes indenters arranged in two rows, wherein in each row, the indenters with the first priority in the row are located in the same column, allowing the column of indenters to make first contact with the substrate 500. In the embodiment of FIG. 5, due to the arrangement of the indenters, the die 400 moves across the surface of the substrate 500 from right to left to create impressions. In other embodiments, the die 400 can be configured to move across the substrate 500 in any direction, given that the indenter with the first priority creates the initial impression and so on until the indenter with the last priority creates the final impression.

Figure 6:
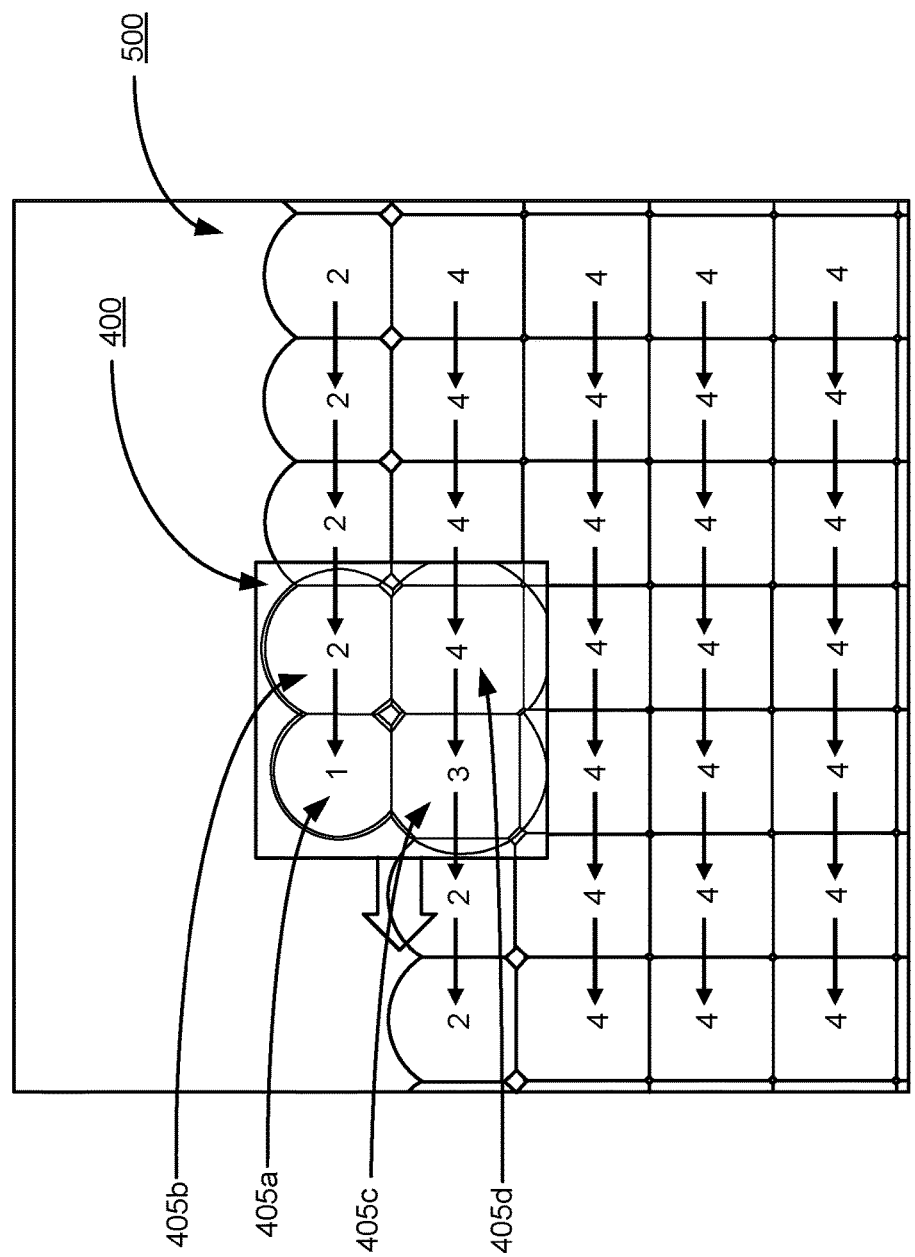
FIG. 6 is a top-down view of the example tool path sequence in FIG. 5 illustrating the progressive formation of each microlens mold, according to an embodiment.

FIG. 6 is a top-down view of the example tool path sequence in FIG. 5 illustrating the progressive formation of each microlens mold, according to an embodiment. To begin the stamping process, the indenter 405a creates the initial impression on the substrate 500. The initial impression may be created in the bottom right corner of the substrate 500, as shown in FIG. 5, but the placement of the initial impression may vary. For the first row of impressions created, the indenter 405a leads from right to left, creating initial impressions, and is followed by the indenter 405b, such that when the row of impressions is formed, each impression is approximately the size of the indenter 405b. The actuator re-positions the die 400 at the right side of the substrate 500 such that the indenter 405c aligns with the initial row of impressions created, and the indenter 405a begins forming initial impressions in a new row. Once positioned, the actuator again moves the die 400 from right to left, such that the indenter 405a leads the new row and is followed by the indenter 405b while the indenter 405c modifies the impressions in the previous row and is followed by the indenter 405d to make the final impression, thus creating the final shape for each microlens mold. In other embodiments wherein the die 400 includes additional indenters 405, several rows of impressions may be created simultaneously (e.g., two or more).

Figure 7A:
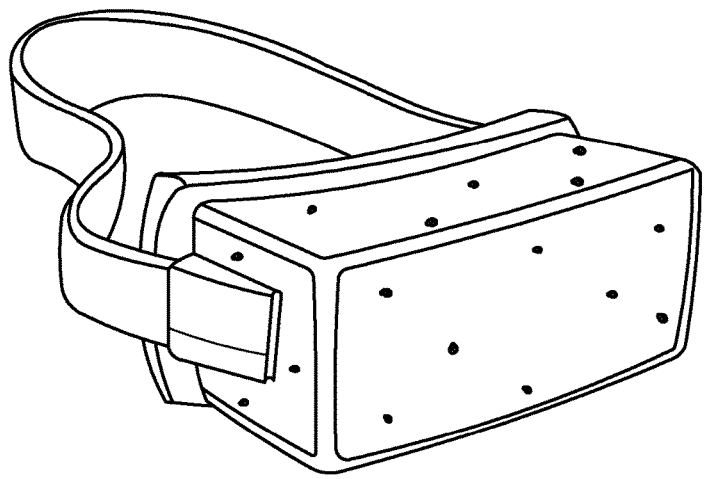
FIG. 7A is a diagram of a Head-Mounted Display (HMD), according to an embodiment.
Figure 7B:
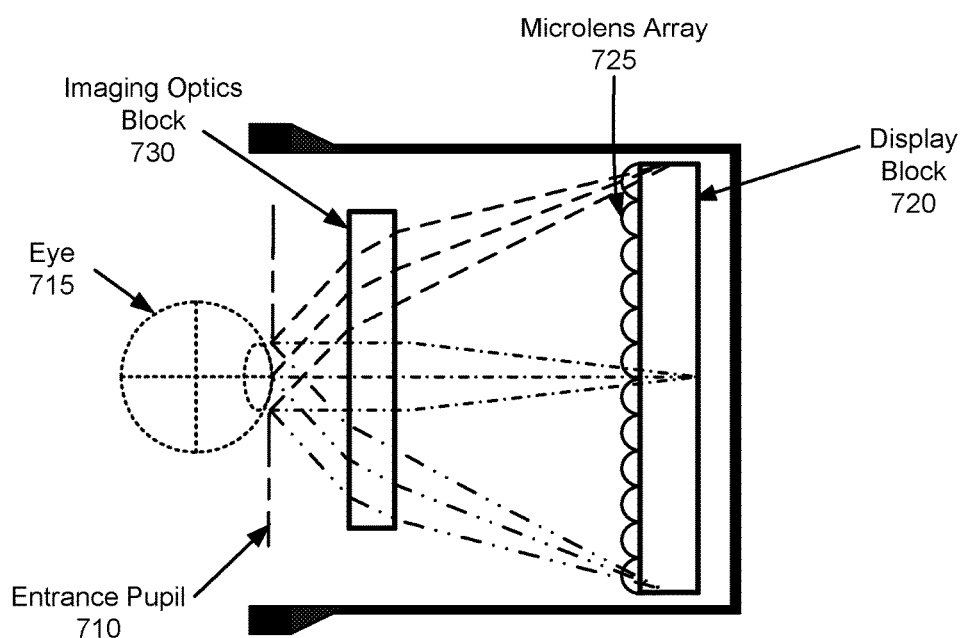
FIG. 7B is a cross-section of the HMD as shown in FIG. 7A, according to an embodiment.

FIG. 7A is a diagram of a Head-Mounted Display (HMD) 700, according to an embodiment. The HMD 700 may be part of, e.g., a virtual reality (VR) system environment, wherein the HMD 700 presents content to a user. Example content includes images, video, audio, or some combination thereof. Audio content may be presented via a separate device (e.g., speakers and/or headphones) external to the HMD 700 that receives audio information from HMD 700, a virtual reality (VR) console, or both. In some embodiments, the HMD 700 may also or alternatively act as an augmented reality (AR) and/or mixed reality (MR) HMD. In these embodiments, the HMD 700 augments views of a physical, real-world environment with computer-generated elements (e.g., images, video, sound, etc.). In the embodiments of FIGS. 7A-B, the HMD 700 includes an electronic display (not shown).

FIG. 7B is a cross-section 705 of the HMD 700 shown in FIG. 7A, according to an embodiment. As shown in FIG. 7A, the HMD 700 includes display elements and focusing optics that direct light to an entrance pupil 710 of the eye 715. For purposes of illustration, FIG. 7B shows a cross section 705 of the HMD 700 associated with a single eye 715, but additional, separate display elements may provide altered image light to the other eye of the user. In the embodiment of FIG. 7B, the cross-section 705 of the HMD 700 includes a display block 720, a microlens array 725, and an imaging optics block 730.

The display block 720 includes a source that generates image light. In various embodiments, the display block 720 may comprise a single electronic display or multiple electronic displays (e.g., a display for each eye of a user). Examples of the electronic display include: a liquid crystal display (LCD), an organic light emitting diode (OLED) display, an active-matrix organic light-emitting diode display (AMOLED), a transparent organic light emitting diode display (TOLED), some other display, a projector, or some combination thereof. The display block 720 may also include display block optical elements and/or actuators for minimizing the conflict between accommodation and vergence. A display block optical element may be an aperture, a Fresnel lens, a convex lens, a concave lens, a filter, a polarizer, a diffuser, a fiber taper, or any other suitable optical element that affects the image light emitted from the electronic display. In some embodiments, a plurality of the display block optical elements may have a plurality of coatings, such as anti-reflective coatings.

The microlens array 725 is an optical element that may be used in imaging technologies, such as the HMD 700, to improve the amount of imaging information (e.g., light) captured. The microlens array 725 may be manufactured using a microlens mold created by the stamping process as described with regards to FIG. 3 or FIGS. 5-6. The manufactured microlens array 725 may then be secured to the display block 720 via a securing mechanism. Examples of securing mechanisms may include adhesion, lamination, mechanical fasteners, or any other suitable securing mechanism. The microlens array 725 may be an embodiment of microlens array 100.

The imaging optics block 730 includes a plurality of optical elements that focus the light received from the display block 720 and through the microlens array 725 and present the focused light to a user. In some embodiments, the imaging optics block 730 may have a varifocal function via actuation or active optical elements and a plurality of coatings (e.g., anti-reflective coatings). Magnification of the image light by the imaging optics block 730 allows elements of the display block 720 to be magnified to provide a large field of view to the user. Additionally, in some embodiments, the amount of magnification may be adjusted by adding or removing optical elements.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a die comprising a plurality of protrusions that protrude outwards from a surface of the die, each of the protrusions having a different priority that is based on a relative size of each protrusion, wherein the die is a unitary die;
   an actuator coupled to the die, the actuator configured to stamp a substrate with one or more of the plurality of protrusions on the die in accordance with actuation instructions; and a controller configured to:
  generate actuation instructions that cause the actuator to stamp out a plurality of microlens molds into the substrate, where each microlens mold is generated by stamping, in a specific order based on priority, each of the plurality of protrusions on a same corresponding location on the substrate, and
  provide the actuation instructions to control the actuator.

2. The system of claim 1, wherein the shape of one or more protrusions is substantially dome-shaped, and wherein each protrusion is of a different size.

3. The system of claim 1, wherein the die comprises a single row of protrusions and each protrusion has a priority that indicates its order in which the protrusion is stamped into the corresponding location on the substrate.

4. The system of claim 3, wherein the plurality of protrusions are arranged on the die in succession of increasing priority.

5. The system of claim 1, wherein the die comprises a plurality of protrusions arranged in a 2-D array having multiple rows and columns, wherein each protrusion has a priority that indicates its order in which the protrusion is stamped into the corresponding location on the substrate.

6. The system of claim 5, wherein the plurality of protrusions are arranged in order of increasing priority across each row of the array.

7. The system of claim 6, wherein the plurality of protrusions are arranged in order of increasing priority down each column of the array.

8. The system of claim 5, wherein the actuation instructions cause the actuator to stamp each of the plurality of protrusions in order of increasing priority, such that a protrusion with first priority creates an initial impression at the corresponding location and each successive protrusion modifies the shape of the initial impression until the protrusion with last priority forms a final shape of a microlens mold.

9. The system of claim 5, wherein the 2-D array comprises an equal number of rows and columns.

10. The system of claim 1, wherein the actuation instructions cause the die to follow a tool path sequence comprising:
  positioning the die to align a first row of protrusions with a first priority at a specific location on the substrate;
  stamping the first row of protrusions into the substrate to create an initial row of impressions;
  positioning the die to align a second row of protrusions with a second priority with the initial row of impressions at the specific location on the substrate; and
  stamping the second row of protrusions into the initial row of impressions.

11. The system of claim 1, wherein the actuation instructions cause the die to follow a tool path sequence comprising:
  positioning the die to align a protrusion with a first priority at a specific location on the substrate;
  stamping the protrusion with the first priority into the substrate to create an initial impression;
  positioning the die to align a protrusion with a second priority with the initial impression at the specific location on the substrate; and
  stamping the protrusion with the second priority into the initial impression.

12. The system of claim 1, wherein the arrangement of the plurality of protrusions on the die dictates a tool path sequence of the stamping of each of the plurality of protrusions.

13. The system of claim 1, wherein the actuator is a piezoelectric stack.

14. The system of claim 13, wherein the actuator is coupled to the die and is configured to position the die relative to the substrate.

15. The system of claim 13, wherein the actuator is coupled to the substrate and is configured to position the substrate relative to the die.

16. A system comprising:
  a die comprising a plurality of protrusions that protrude outwards from a surface of the die, each of the protrusions having a different priority that is based on a relative size of each protrusion, wherein the die is a unitary die;
  an actuator coupled to the die, the actuator configured to position the die relative to a substrate in accordance with a tool path sequence; and
  a controller configured to:
    generate a tool path sequence that causes the actuator to position the die relative to the substrate such that each of the plurality of protrusions stamps, in a specific order based on priority, a same corresponding location on the substrate, and
    provide the actuation instructions to control the actuator.

17. The system of claim 16, wherein each protrusion of the plurality of protrusions has a priority that indicates its order in which the protrusion stamps the corresponding location on the substrate.

18. The system of claim 17, wherein the actuation instructions cause the actuator to stamp each of the plurality of protrusions in order of increasing priority, such that a protrusion with first priority creates an initial impression at the corresponding location and each successive protrusion modifies the shape of the initial impression until the protrusion with last priority forms a final shape of a microlens mold.

19. The system of claim 16, wherein the arrangement of the plurality of protrusions on the die dictates a tool path sequence of the stamping of each of the plurality of protrusions.

20. A system comprising:
  a die comprising a plurality of protrusions that protrude outwards from a surface of the die, each of the protrusions having a different priority that is based on a relative size of each protrusion, wherein the die is a unitary die;
  an actuator coupled to the die, the actuator configured to position a substrate relative to the die in accordance with actuation instructions; and
  a controller configured to:
    generate actuation instructions that cause the actuator to position the substrate relative to the die to stamp, in a specific order based on priority, each of the plurality of protrusions on a same corresponding location on the substrate, and
    provide the actuation instructions to control the actuator.

* * * * *